Oct. 27, 1970   D. G. GRUETT   3,535,931
COMBINED LIQUID LEVEL AND TEMPERATURE GAUGE
Filed Sept. 27, 1968
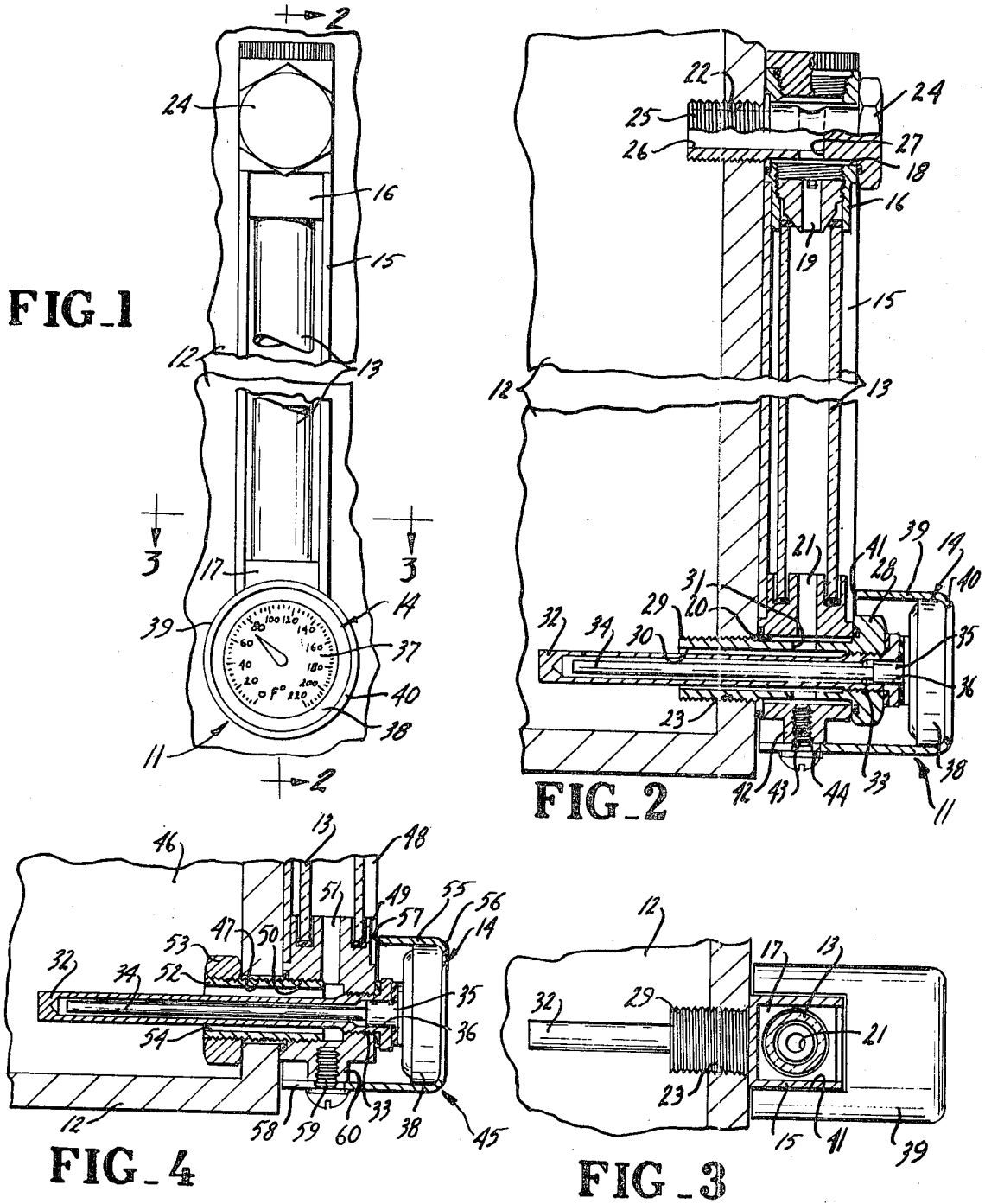
INVENTOR.
DONALD G. GRUETT
BY
Andrus, Sceales, Starke & Sawall
Attorneys

United States Patent Office 3,535,931
Patented Oct. 27, 1970

3,535,931
COMBINED LIQUID LEVEL AND
TEMPERATURE GAUGE
Donald G. Gruett, Manitowoc, Wis., assignor to Oil-Rite
Corporation, Manitowoc, Wis., a corporation of
Wisconsin
Filed Sept. 27, 1968, Ser. No. 763,161
Int. Cl. G01f 23/02
U.S. Cl. 73—292                    5 Claims

ABSTRACT OF THE DISCLOSURE

A combined liquid level and temperature gauge includes sight glass means and a thermometer having a sensing element. The mounting means for the gauge are adapted to place the sight glass means in liquid communication with the tank and to receive a thermometer well secured relative to the gauge. The sensing element of the thermometer is disposed in the well and a shield member interlocked with the gauge protects the thermometer and retains the same in the well.

---

This invention relates to a combination gauge for indicating the level and temperature of the liquid in a container or tank.

Separate and independent mounting of instruments such as liquid level gauges and thermometers on industrial or commercial tank installations for oil, chemicals or other liquid increases the chances for possible accident and resultant damage. As the number of openings in a tank is increased to accommodate various separate and independent instruments, sources for possible leakage are also increased. It is therefore desirable to combine instruments for mounting on liquid containing tanks wherever possible. It is generally an object of this invention to provide an improved combined liquid level and temperature gauge.

Generally, according to this invention, a combined liquid level and temperature gauge includes a sight glass means for indicating the liquid level and a thermometer unit for temperature indication. The sight glass means comprises a sight glass housed in an enclosure having a hollow portion communicating with the sight glass. The means for mounting the gauge onto a container or tank wall serves to connect the container to the hollow portion of the enclosure. The gauge mounting means is provided with a horizontally extending passage means which place the container contents in communication with the hollow portion of the enclosure and hence with the sight glass. A horizontally extending well is disposed in the passage means of the mounting means and projects into the container. The well is secured relative to the sight glass enclosure and opens in the forward direction to receive the sensing element or probe of the thermometer unit. And means are further provided to secure the thermometer unit relative to the well and sight glass enclosure.

The drawings furnished herewith illustrate the best mode presently contemplated and set forth hereinafter.

In the drawings:

FIG. 1 is a front elevation of a combined liquid level and temperature gauge according to the invention;

FIG. 2 is a sectional view taken generally on line 2—2 of FIG. 1;

FIG. 3 is a sectional view taken generally on line 3—3 of FIG. 1; and

FIG. 4 is a partial sectional view similar to the corresponding portion of FIG. 2 and shows a further embodiment of the invention.

Referring to the drawings, the combined liquid level and temperature gauge 11 is mounted on the wall of a container or tank 12 for liquids. The gauge 11 comprises sight glass means including the tubular sight glass 13 mounted within the enclosure 15 and which is adapted to indicate the level of the liquid in the tank 12 and a thermometer 14 for indicating the temperature of the liquid. Both the sight glass 13 and the thermometer 14 are exposed to view in at least the forward direction.

The sight glass 13 is housed within the vertically disposed protective enclosure 15 and communicates with the vertically spaced end portions 16 and 17 thereof. At the upper end, the sight glass 13 is connected with the fore-and-aft extending through bore 18 by the vertical passage 19. At the lower end of the gauge, the sight glass 13 is connected with a fore-and-aft extending through bore 20 via the vertical passage 21.

The gauge 11 of FIGS. 1 through 3 is adapted for mounting onto a tank 12 having vertically spaced tapped or threaded openings 22 and 23 making access to the interior of the tank unnecessary during installation. At the upper end, the gauge 11 is fastened to the tank 12 by the hollow bolt 24 which extends through the bore 18 and has a threaded shank portion 25 engageable within the tank opening 22. The longitudinally extending bore 26 in bolt 24 opens into the tank 12 and communicates with the end portion through bore 18 via the intersecting cross bore 27. Thus, within the range of gauge 11, the sight glass 13 is vented into the tank 12 via the connecting bore openings 19, 18, 27 and 26.

The lower mounting bolt 28 extends through the bore 20 of the lower gauge end portion 17 and has a threaded shank portion 29 engaged within tank opening 23. Interiorly, the bolt 28 is provided with a longitudinally extending through bore 30 which opens into the tank 12 and communicates with the enclosure through bore 20 via the intersecting cross bore 31. Thus, the connecting bore openings 21, 20, 31 and 30 place the lower end of the sight glass 13 in communication with the tank 12 so that the sight glass may reflect the liquid level in the tank.

The through bore 30 is provided with a threaded portion at the forward or head end of mounting bolt 28 and is adapted to receive and support the thermometer assembly of gauge 11 as hereinafter described.

The thermometer assembly includes a well 32 which extends through the bore 30 of mounting bolt 28 and projects into the tank 12. The well 32 is provided with a forwardly disposed exterior threaded portion 33 which is threadedly engaged within the forward portion of bore 30 to secure the well generally concentrically within the mounting bolt 28. The well 32 is adapted to receive the probe or sensing element 34 of the thermometer 14. The forward enlarged portion 35 of the thermometer probe element 34 is slidably received within the counterbore 36 at the entrance to the well 32 to generally center the probe element within the well. The well 32 assumes the temperature of the surrounding liquid in the tank 12 which is conveyed to the probe element 34 and indicated on the dial 37 on the forward face of the cylindrical head portion 38 of thermometer 14.

The thermometer 14 is held in place by a tubular shield member 39 which slides over the thermometer head portion 38 and has an inwardly directed circumferential lip 40 at the forward end thereof engaging the corresponding part of the forward face of head portion 38 outwardly from dial 37. The shield member 39 extends generally to the rear edges of the gauge enclosure 15 with the gauge enclosure being received in a rearwardly opening recess 41 of the shield member. The lower portion of shield member 39 extends beneath the end portion projection 42 with the threaded member 43 engaged therein being received in the rearwardly opening recess 44 which is generally diametrically opposed from recess 41. After the shield member 39 is assembled onto the gauge 11, the threaded member 43 secures member 39 relative to the gauge enclosure 15. The several recesses 41 and 44 provide an interlock engagement between the shield member 39 and sight glass enclosure 15 to provide the thermometer unit 14 maximum protection against breakage from accidental causes.

In the embodiment of FIG. 4, the combined liquid level and temperature gauge 45 is adapted for mounting on a container or tank 46 for liquids having a drilled opening 47. The enclosure 48 of gauge 45 includes the lower end portion 49 which is provided with a generally horizontal fore-and-aft extending stepped through bore 50 which communicates with the sight glass 13 via the vertical bore 51. The through bore 50 of end portion 49 is provided with threaded portions at the respective ends thereof.

In the mounting of gauge 45 onto the tank 46, a hollow stud 52 engages within the threaded bore 50 and extends through the opening 47 into the tank where the stud is engaged by the nut 53 to secure the gauge to the tank. A bore opening 54 extends longitudinally through the stud 52 placing the liquid contents of the tank 46 in communication with the end portion bore 50 and hence with the sight glass 13.

The thermometer well 32 extends through the bore 50 of end portion 49 and the aligned bore 54 of the stud member 52 and projects into the tank 46. The forwardly disposed externally threaded portion 33 of well 32 is threadably engaged in the forward portion of bore 50 to secure the well relative to the end portion 49 of the enclosure 48.

The well 32 of gauge 45 receives the thermometer probe element 34 with the enlarged forward portion 35 of the probe element being slidably received in the counterbore 36 at the entrance to the well similarly as in FIGS. 1 through 3. The thermometer 14 of gauge 45 is held in place by the tubular shield member 55, the forward inwardly directed circumferential lip 56 of which engages the forward face of thermometer head portion 38 outwardly from dial 37. The shield member 55 extends generally to the rear edges of gauge 45 with diametrically opposed recesses 57 and 58 opening rearwardly to respectively receive the gauge enclosure 48 and the threaded member 59 which engages into the end member projection 60 to secure the shield member relative to the sight glass enclosure. Shield member 55 is somewhat shorter but otherwise generally similar to the corresponding member 39 of FIGS. 1 through 3.

The invention thus provides an improved combined liquid level and temperature gauge which is assembled and installed with relative ease on tanks having either drilled or threaded openings receiving the gauge mounting means. If removal for checking or replacement of the thermometer unit is desired or becomes necessary, such limited disassembly is relatively simple and does not require an initial draining of the tank. The protection afforded the several gauge elements minimizes possible breakage from accidental causes.

Various modes of carrying out the invention are contemplated as being within the scope of the following claims, particularly pointing out and distinctly claiming the subject matter which is regarded as the invention.

I claim:

1. In a gauge for indicating the level and temperature of the liquid in a container, a vertically extending sight glass for indicating the liquid level, an enclosure for housing the sight glass and including an end portion having a generally horizontal fore-and-aft extending through bore communicating with the sight glass, a bolt member disposed in the through bore of said enclosure end portion and threadedly engaged within an opening in the container to secure the gauge to the container wall, said bolt member having a longitudinally extending through bore communicating with the enclosure end portion through bore and hence with the sight glass, said bolt member through bore having a threaded entrance portion, a horizontally extending well concentrically disposed in the bolt member through bore and projecting into the container and being threadedly engaged within said through bore entrance portion, a thermometer unit having a sensing element disposed in the well and a temperature indicating head portion on the forward end of said sensing element, a tubular shield member extending circumferentially of the temperature indicating head portion and retaining the thermometer unit in the well and being recessed rearwardly thereof, said recess being adapted to receive the sight glass enclosure therein to interlock the shield member therewith to thereby better protect the thermometer unit against damage from accidental causes, and means securing the shield member to the sight glass enclosure.

2. In a gauge for indicating the level and temperature of the liquid in a container, a vertically extending sight glass for indicating the liquid level, an enclosure for housing the sight glass and including an end portion having a generally horizontal fore-and-aft extending through bore threaded at the respective ends thereof and communicating with the sight glass, a stud bolt member engaged in the bore of said enclosure end portion and extending rearwardly through an opening in the container wall for securement of the gauge, said stud bolt member having a longitudinally extending through bore communicating with the through bore in the enclosure end portion and hence with the sight glass, a horizontally extending well concentrically disposed in the bore of said stud bolt member and projecting into the container and being threadedly engaged at the forward end of the through bore in said enclosure end member, a thermometer unit having a sensing element disposed in the well and a temperature indicating head portion on the forward end of said sensing element, a tubular shield member extending circumferentially of the temperature indicating head portion and retaining the thermometer unit in the well and being recessed rearwardly thereof, said recess being adapted to receive the sight glass enclosure therein to interlock the shield member therewith to thereby better protect the thermometer unit against damage from accidental causes, and means securing the shield member to the sight glass enclosure.

3. In combination with an assembly of a vertically extending liquid level gauge and means for mounting the gauge onto the wall of a tank and providing communication between said gauge and the interior of said tank through an opening in the tank wall, a well extending through the assembly and generally coaxially through said opening in the tank wall and opening outwardly of said assembly, means securing said well with respect to said assembly, a thermometer unit having a sensing probe element disposed in said well and a temperature indicating head portion forwardly thereof, a tubular shield member extending circumferentially of the temperature indicating head portion and retaining the thermometer unit in the well, the wall of said shield member being recessed from the rear to interlock with said gauge to thereby better protect the thermometer unit against damage from accidental causes, and means securing the shield member to the sight glass enclosure.

4. In a gauge for indicating the level and temperature of the liquid in a tank, vertically extending sight glass means for indicating the liquid level and having a generally horizontal fore-and-aft extending bore, means disposed in said bore and extending through an opening in the tank wall for mounting the sight glass means onto the tank wall, said mounting means being hollow and adapted to place the tank contents in communication with the sight glass means, a horizontally extending well disposed in said hollow mounting means and open at its forward end, said well being secured relative to the sight glass means and the mounting means, a thermometer unit having a sensing probe element disposed in the well and a temperature indicating head portion forwardly thereof, a tubular shield member extending circumferentially of the temperature indicating head portion and retaining the thermometer unit in the well, the wall of said shield member being recessed from the rear to interlock with said gauge to thereby better protect the thermometer unit against damage from accidental causes, and means securing the shield member to the sight glass enclosure.

5. In a gauge for indicating the level and temperature of the liquid in a container, a vertically extending sight glass for indicating the liquid level, an enclosure for housing the sight glass and having a hollow portion thereof communicating with the sight glass, means for mounting the gauge onto a container wall and connecting the container to the hollow portion of the enclosure, said mounting means having horizontally extending passage means placing the container contents in communication with the hollow portion of the enclosure and hense with the sight glass, a horizontally extending well disposed in the horizontal passage means of said mounting means, said well being secured relative to the enclosure and opening forwardly thereof, a thermometer unit having a sensing element disposed in the well and a temperature indicating head portion forwardly thereof, a tubular shield member extending around the temperature indicating head portion and retaining the thermometer unit in the well, the wall of said shield member being recessed rearwardly to interlock with the sight glass enclosure to thereby better protect the thermometer unit against damage from accidental causes, and means securing the shield member to the sight glass enclosure.

References Cited
UNITED STATES PATENTS

| | | | |
|---|---|---|---|
| 1,434,645 | 11/1922 | Anderson | 73—326 |
| 1,570,938 | 1/1926 | Butler et al. | 73—292 |
| 2,019,478 | 11/1935 | Buckermann | 73—326 |
| 2,603,091 | 7/1952 | Lamb | 73—363.9 X |
| 2,620,663 | 12/1952 | Fine | 73—325 |
| 3,058,347 | 10/1962 | Smitz | 73—363.9 |
| 3,154,945 | 11/1964 | Busillo | 73—328 X |
| 3,212,334 | 10/1965 | Conlon | 73—326 |
| 3,292,434 | 12/1966 | McDaniel | 73—292 X |
| 3,358,510 | 12/1967 | Hoffmann et al. | 73—329 |
| 3,455,163 | 7/1969 | Lukas et al. | 73—292 |

LOUIS R. PRINCE, Primary Examiner

D. M. YASICH, Assistant Examiner